Feb. 28, 1933. J. WEINBERGER ET AL Re. 18,751

LOUD SPEAKER

Original Filed March 31, 1927

INVENTOR
J. WEINBERGER
L. WOLFF
BY H. S. Grover
ATTORNEY

Reissued Feb. 28, 1933

Re. 18,751

UNITED STATES PATENT OFFICE

JULIUS WEINBERGER, OF HADDONFIELD, AND IRVING WOLFF, OF MERCHANTSVILLE, NEW JERSEY, ASSIGNORS TO RADIO CORPORATION OF AMERICA, A CORPORATION OF DELAWARE

LOUD SPEAKER

Original No. 1, 760,862, dated May 27, 1930, Serial No. 179,743, filed March 31, 1927. Application for reissue filed May 25, 1932. Serial No. 613,532.

This invention relates to the art of sound reproducing devices and deals more specifically with the provision of a loud speaker device built-in or enclosed by the cabinet of a radio receiving set or phonograph.

In the usual structure of the cabinets employed in connection with radio receiving apparatus the rear wall of the cabinet is left open to provide for ventilation of certain of the radio apparatus. It, therefore, follows that when a loud speaker device is mounted in such a cabinet the cabinet acts as a resonator, thus destroying the fidelity of response of the loud speaker, by over-emphasizing certain of the frequencies corresponding to the natural period of the system at resonance. This effect has been explained in the following way:

The space contained within the cabinet rearwardly of the loud speaker is a pressure area, while the mouth of the opening at the rear of the cabinet is a high velocity area. This phenomenon may be better understood from the mechanical analogy in which the air within the cabinet rearwardly of the loud speaker may be considered a spring, while the air at the rear opening of the cabinet may be considered a mass which loads the spring and causes the vibration. The vibrations, of course, are originally set up by the movement of the loud speaker device and when the frequencies emitted from the loud speaker approximate the frequency corresponding to the natural period of the air cavities the system resonates freely.

There are two possible ways of overcoming this undesirable effect. The first one is to stop the motion of the air behind the loud speaker by means of an enclosure or casing. The second method is to release the pressure of air within the cabinet or in other words, to cut off the spring referred to in the above mechanical analogy by providing openings in the front of the cabinet adjacent to the loud speaker. Either one of these methods or both in combination have been found to give highly improved results.

It is, therefore, an object of this invention to provide a built-in loud speaker device which will give natural and reliable characteristics of sound reproduction.

It is a further object of this invention to prevent the phenomenon of resonance in a cabinet of a built-in loud speaker.

It is a further object of this invention to provide a loud speaker construction adapted to give maximum acoustic efficiency of the sound reproducing diaphragm.

Further it is an object of this invention to provide a built-in loud speaker in which the range of audible frequencies reproduced is a maximum.

These and other objects of the invention will be apparent to one skilled in the art from the following description taken in connection with the accompanying drawing in which.

Figure 1:
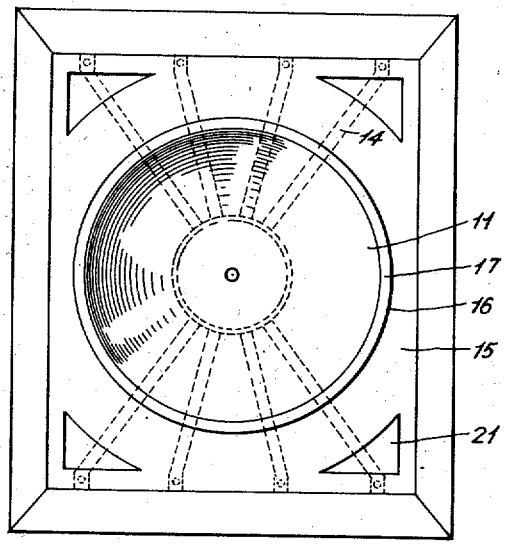
Figure 1 is a front elevational view of a loud speaker embodying this invention.

Referring in detail to the drawing the loud speaker is seen to comprise a vibratile diaphragm 11 to which is coupled a rod 12 which serves to connect the diaphragm to a driving unit 13 of any well known type. For the purposes of the present disclosure a cone diaphragm has been illustrated as the vibratile member but it is to be understood that the invention does not relate specifically to this type of diaphragm, but rather may be applied to any and all types of vibratile diaphragms now know, such as a plane flat disk, a circular vibrating member, as well as oval and other shaped cones, in fact, to any loud speaker which radiates to the rear as well as the front. Also the particular form of driving unit forms no part of the present invention and needs no further description here.

Any of the well known types of reproducing units may be employed.

Attached to the driving unit 13 are the stays or supports 14 which form a frame in the shape of a truncated rectangular pyramid. Of course, other shapes may be conveniently formed but the present has been chosen as a simple and convenient means of support for the cone and driving unit. Jointed to the supports 14 is the plate 15 provided with an aperture 16, shaped to conform to the base of the vibrating member 11. The edge of the cone 11 is joined circumferentially to the plate 15 in any suitable manner designed to provide a so-called free or floating edge. This may be accomplished, for example, by means of a strip 17 of flexible material such as sheep-skin or any suitable textile, the strip being in the form of an annular ring shaped to overlap the edge of the cone and the edge forming the aperture 16. The inner circumference of the annular strip 17 is attached to the edge of the cone; while the outer circumference is joined to the plate 15. Obviously other methods of mounting the vibrating element may be employed without departing from the spirit of this invention.

Figure 2:
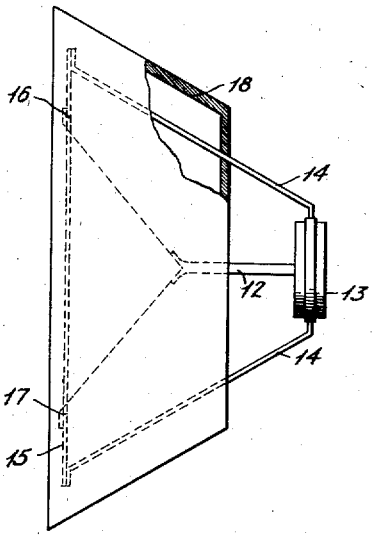
Figure 2 is a side elevational view of the device shown in Figure 1.
Figure 3:
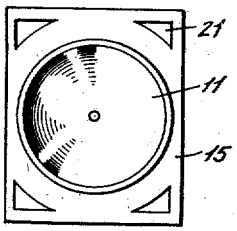
Figure 3 is a front elevational view of the cone and its mounting.
Figure 4:
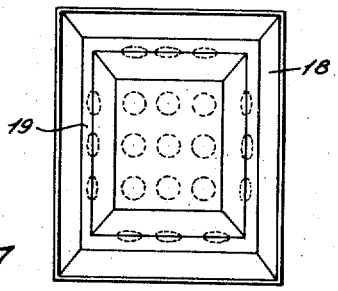
Figures 4 and 5 are detailed views of a casing used in this invention.
Figure 5:
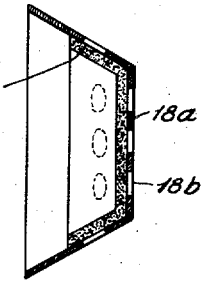

In order to overcome the undesirable effects described above resulting from the fact that the cabinet acts as a resonator, a casing 18 shaped somewhat similarly to the support 14 is provided and arranged with its upper base in a plane between the rear of the vibratile element 11 and the adjacent side of the reproducing unit. The side portions and front edge of the casing 18 are spaced from the support 14 and also from the front face of the cone as shown in Figure 2. The casing may be made of any convenient material such as fiber board, molded compositions, wood or metal or felt. The rear face $18^a$ and a portion of the side faces adjacent to such face are provided with holes $18^b$ cut therethrough which holes are placed in any suitable staggered relation. A layer 19 of sound absorbent or cushioning material such as felt or other fibrous materials is placed upon the inside of the casing covering the face $18^a$ and also the portions of the side faces adjacent thereto as shown in Figures 4 and 5. Instead of the layer 19 applied to the casing as shown it may be found desirable to merely fill the holes $18^b$ with such insulating or absorbent materials. The specific design of the casing 18 may be varied widely to obtain the most satisfactory results, depending upon the particular loud speaker device used therewith.

Openings 21 are provided in the front mounting plate 15 for the purpose of releasing the spring action of the vibrating air between the diaphragm 11 and the casing 18.

It has been found that in the operation of the device with the casing mounted rearwardly of the vibratile element as described above, the lower frequencies of the audible spectrum are substantially reduced. This follows from the fact that the distance between the vibratile element and the rear wall of the casing is small in comparison to the wave length of the sound at the lower frequencies. Now assuming a wave of compression to be sent out from the rear of the vibratile element, for the lower frequencies or longer wave lengths there will be an area of compression extending completely from the diaphragm to the rear wall of the casing and this area of compression will react upon the vibratile diaphragm and damp its vibration with the resultant loss of the lower frequencies. This phenomenon does not take place in connection with the higher frequencies corresponding to shorter wave lengths, for the reason that with these latter frequencies the distance between the vibratile diaphragm and the rear of the casing will not only include a wave of compression but also a wave of rarefaction and there consequently is not a pressure are present to react upon the vibratile diaphragm.

It has also been found that when openings are provided in the front of the cabinet adjacent to the vibratile diaphragm for the purpose of releasing the spring referred to in the mechanical analogy given above and also for the purpose of releasing the pressure reaction of the air between the diaphragm and casing at the low frequencies that the lower wave lengths are lost for another reason, namely, the sound waves emitted from the front of the diaphragm are 180 degrees out of phase with the sound waves emitted from the rear of the diaphragm. When there is a wave of compression rearwardly of the diaphragm there is a wave of rarefaction in the front of the diaphragm and the two tend to neutralize each other through the openings provided with a consequent loss of the lower frequencies. This phenomenon is not present with equal force and effect in connection with the higher frequencies for the reason that with the shorter wave lengths the pressure area set up by the sound waves from front and rear are not necessarily out of phase and the neutralizing effect does not, therefore, take place appreciably.

It has, therefore, been found desirable in order to prevent loss of the lower frequencies due to the reaction of the compression wave upon the diaphragm and also due to the effect of neutralization of the waves which are out of phase, to provide opening 21 in the front mounting of the diaphragm, which openings are spaced from the diaphragm at as great a distance as is permissible in accordance with the dimensions of the apparatus used. By increasing the distance between the vibrating diaphragm and the openings 21 the distance which the waves emanating from the rear of the diaphragm have to travel before combining with the waves emitted from the front of the diaphragm is increased and consequently the "out of phase reaction" described above is eliminated.

Figure 7:
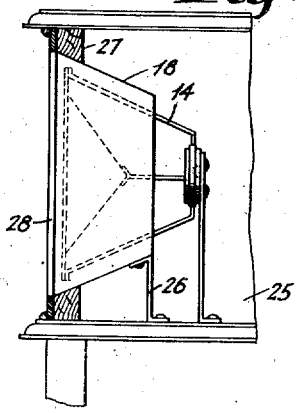
Figure 7 is a fragmentary elevation showing the loud speaker device mounted within the cabinet.

Referring in particular now to Figure 7, the loud speaker device and casing are shown mounted in a cabinet 25 of any suitable radio set which may be and ordinarily is open at the rear. The assembled loud speaker and casing is mounted within the cabinet and secured thereto in any convenient manner such as, for example, by the support 26 which may be screwed or otherwise attached to the casing and to the base of the cabinet. The abutment 27 which is joined to the cabinet cooperates with the adjacent portion of the casing to hold the same firmly in place. The usual covering or grill 28 may be provided in front of the loud speaker device.

While the modification shown in Figure 7 includes the casing member 18 it is to be understood that under certain conditions it may be found desirable to eliminate the use of the casing 18 and rely upon the openings 21 in the front mounting to eliminate the undesirable resonance effect. Also, while the casing has been disclosed specifically mounted between the vibrating diaphragm and the driving unit, it is to be understood that this casing may be mounted rearwardly of the said unit in accordance with the principles of this invention.

Figure 6:
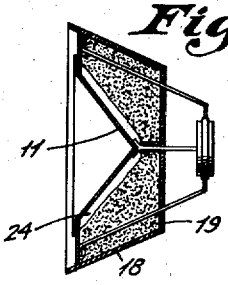
Figure 6 is a detailed view of a modified form of casing.

Referring to Figure 6 there is shown a modified form of casing which is identical with that shown in the preceding figures but which is provided with a packing of felt or other sound absorbent material, which packing is of a thickness to practically fill the entire space between the rear of the vibrating diaphragm and the adjacent faces of the casing. The packing material 19 shown in this figure may be held in place in any suitable manner, such as for example, by threads or wires passing therethrough and joined to the casing. The space 24 between the packing 19 and the cone 11 has a thickness of the order of magnitude of one to two inches.

We claim as our invention:

1. The combination of a loud speaker device having a vibratile diaphragm, with a frame member, a plate secured to the front of said frame, a driving unit secured to said frame rearwardly of said plate, said vibratile diaphragm being connected to said plate and to said driving unit, and a casing embracing said vibratile diaphragm and a portion only of said frame.

2. The combination of a loud speaker device having a vibratile cone shaped diaphragm, with a supporting frame, a plate mounted on said frame, said plate being provided with a first aperture shaped to conform to the base of said cone, flexible means to join the edge portion of said cone to the edge of said aperture, said plate being formed with other apertures spaced from said first mentioned aperture, and a casing mounted rearwardly of said diaphragm and extending forwardly thereof.

3. A loud speaker device comprising a vibratile diaphragm, a supporting frame, a plate mounted in front of said frame, said plate being provided with apertures arranged in predetermined relation, a driving unit for said diaphragm, flexible means to connect said diaphragm to said plate, and a casing interposed between said driving unit and said diaphragm and extending forwardly of said diaphragm, said casing being spaced from said plate whereby pressure due to the sound waves from the rear of said diaphragm is released through the apertures and around the edge of said plate.

4. A casing for a loud speaker device comprising a rigid casing having apertures formed therein and a lining of sound absorbent material placed in the inside of said casing and covering said apertures.

5. The combination of a cabinet, a loudspeaker device having a diaphragm, said loudspeaker device being mounted in said cabinet, a casing mounted rearwardly of said diaphragm and substantially enclosing the rear of said diaphragm whereby sound waves from the rear of said diaphragm are prevented from circulating in said cabinet, and baffle means for preventing substantial interference between sound waves from the front and rear of the diaphragm.

6. The combination of a radio cabinet, a loud speaker device having a vibratile diaphragm, means supporting said loud speaker device within said cabinet with its diaphragm adjacent an opening in the cabinet, a casing arranged rearwardly of said diaphragm to substantially enclose the rear of said diaphragm whereby sound waves from said diaphragm are kept out of said cabinet, and a baffle plate at the peripheral edge of said diaphragm.

7. The combination of a cabinet and a built-in loud speaker, with a casing mounted in said cabinet rearwardly of said loud speaker, and sound absorbent means mounted between said loud speaker and said casing.

8. The combination of a cabinet and a built-in loud speaker, with a casing mounted in said cabinet rearwardly of said loud speaker, said casing being provided with apertures.

9. In combination, a cabinet providing a compartment having an opening in one side thereof, a loud speaker in said compartment with its diaphragm adjacent said opening, a casing arranged to substantially enclose the rear of said diaphragm, and a baffle plate adjacent the peripheral edge of said diaphragm, said baffle plate being provided with apertures for releasing the sound wave pressure set up within said casing.

10. In combination a cabinet having a compartment provided with an opening in one side of said cabinet, a plate mounted in said opening, said plate being provided with apertures, a loud speaker mounted in said compartment, a casing mounted rearwardly of said loud speaker, and sound absorbent means mounted between said loud speaker and said casing.

11. In combination a cabinet having a compartment provided with an opening in one side of said cabinet, a plate mounted in said opening, said plate being provided with apertures, a loud speaker, mounted in said compartment, a casing mounted in said compartment rearwardly of said loud speaker, said casing being provided with apertures, and sound absorbent means carried by said casing.

12. A casing for a loudspeaker device having a conical diaphragm, comprising a rigid frustum shaped member provided with apertures in the lateral surface thereof, and a layer of sound absorbing material within said frustum shaped member.

13. A casing for a loudspeaker device having a conical diaphragm and a driving member connected thereto, comprising a rigid frustum shaped member open at its larger base and substantially closed at its smaller base, said member being provided with apertures in the lateral surface thereof and an additional aperture in the smaller base through which said driving member extends.

14. A loudspeaker comprising a vibratile diaphragm, a supporting member, flexible means for connecting said diaphragm to said supporting member, a frustum shaped casing extending rearwardly from said supporting member to substantially enclose the rear of said diaphragm, a plurality of openings in the lateral surface of said frustum shaped casing, and a layer of sound absorbing material covering at least a portion of the interior of said casing.

15. A loudspeaker comprising a vibratile diaphragm, a supporting member, flexible means for mounting said diaphragm in said supporting member, a frustum shaped casing extending rearwardly from said supporting member to substantially enclose the rear of said diaphragm, a plurality of openings in the lateral surface of said frustum shaped casing, a driving member connected to said diaphragm, and an opening in the smaller base of said frustum shaped casing through which said driving member extends.

16. A loudspeaker comprising a vibratile diaphragm, a supporting member, flexible means connecting the periphery of said diaphragm with said supporting member, a frustum shaped casing cooperating with said supporting member to substantially enclose the rear of said diaphragm, a plurality of openings in said frustum shaped casing, and sound absorbing material disposed within said casing.

17. A loudspeaker comprising a conical diaphragm, a frustum shaped casing substantially enclosing the rear of said diaphragm, a plurality of openings in said frustum shaped casing, a driving unit for said diaphragm positioned outside of said casing, and an operative connection between said driving unit and said diaphragm, said connection extending through one of said openings.

18. A casing for surrounding the rear of the diaphragm of a vibratile system comprising a frustum shaped body open at its larger base, a plurality of openings in the lateral surface of said body, and an opening at the smaller base of said body through which a portion of said vibratile system is adapted to extend.

19. A casing for a loudspeaker device having a vibratile system including a diaphragm, comprising a rigid frustum shaped member open at its larger base, said member being adapted to be positioned in back of said diaphragm with its larger base substantially in the plane of the peripheral edge of said diaphragm, a plurality of openings in the lateral surface of said member, and an additional opening in the smaller base of said member through which a portion of said vibratile system is adapted to extend.

20. Acoustic apparatus comprising a vibratile system including a diaphragm, a frustum shaped casing open at its larger base arranged in back of said diaphragm with its larger base substantially in the plane of the peripheral edge of the diaphragm, openings in the lateral surface of said casing, an opening at the smaller base of said casing through which a portion of said vibratile system extends, and a magnet system for said vibratile system arranged outside of said casing.

21. In a translating device, a diaphragm-compartment, a compartment communicating therewith, and means for reducing resonance phenomena in said compartments.

22. In a translating device, a diaphragm-compartment, a compartment communicating therewith, and means for increasing the resistance to the passage of air between said compartments, whereby resonance phenomena may be substantially prevented.

23. In a translating device, a resonant diaphragm-compartment, a resonant compartment communicating therewith, and means for damping the development of resonance phenomena in said compartments.

24. In a translating device, a vibratile diaphragm, a diaphragm compartment at least partially enclosing said diaphragm and being resonant to a vibration frequency thereof, a second compartment, and means comprising a partially obstructed air passage joining said compartments.

25. In a translating device, a vibratile diaphragm, a diaphragm compartment at least partially enclosing said diaphragm and being resonant to a vibration frequency thereof, means comprising a communicating compartment and vibration damping means between said two compartments for preventing the development of resonance phenomena in said diaphragm compartment.

26. In a translating system, a vibratile diaphragm, a diaphragm compartment resonant to a vibration frequency of said diaphragm and means for critically damping the system, whereby resonance phenomena at the said vibration frequency are minimized.

27. Acoustic apparatus comprising a loudspeaker including a vibratile diaphragm, a panel having an opening therein commensurate in size with the dimensions of the peripheral edge of said diaphragm, means supporting said loudspeaker with said diaphragm adjacent said opening, a casing extending rearwardly from the plane of said panel to substantially enclose the rear of said diaphragm, and an opening small compared with the first mentioned opening located in said panel in the vicinity of the first mentioned opening.

28. Acoustic apparatus comprising a loudspeaker including a vibratile diaphragm, a panel having an opening therein commensurate in size with the dimensions of the peripheral edge of said diaphragm, means supporting said loudspeaker with said diaphragm adjacent said opening, a housing extending rearwardly of said panel to substantially enclose the rear of said diaphragm, and means providing communication between the enclosure formed by said housing and the free air in the neighborhood of the front of said diaphragm, said means including a plurality of openings in said panel which are small compared to the size of the first mentioned opening.

29. Acoustic apparatus comprising a loudspeaker including a vibratile diaphragm, a panel having an opening therein, means mounting said loudspeaker with said diaphragm adjacent said opening, said panel being adapted to act as a baffle for sound waves from the rear of said diaphragm, a casing substantially enclosing the rear of said diaphragm, and means providing an air passageway between the space enclosed at the rear of said diaphragm and the free air near the front of said diaphragm, said means consisting of at least one opening in said panel so small as to not materially affect the baffle action of said panel.

JULIUS WEINBERGER.
IRVING WOLFF.